(No Model.) 2 Sheets—Sheet 1.

W. BLACK & T. LARKIN.
ROASTING FURNACE.

No. 322,780. Patented July 21, 1885.

Witnesses:
Harry Drury
John M. Clayton

Inventors
William Black
and Thomas Larkin
by their Attorneys
Howson & Sons (No Model.) 2 Sheets—Sheet 2.

W. BLACK & T. LARKIN.
ROASTING FURNACE.

No. 322,780. Patented July 21, 1885.

UNITED STATES PATENT OFFICE.

WILLIAM BLACK AND THOMAS LARKIN, OF SOUTH SHIELDS, COUNTY OF DURHAM, ENGLAND.

ROASTING-FURNACE.

SPECIFICATION forming part of Letters Patent No. 322,780, dated July 21, 1885.

Application filed November 13, 1884. (No model.) Patented in England March 11, 1884, No. 4,718.

*To all whom it may concern:*

Be it known that we, WILLIAM BLACK, manufacturer, and THOMAS LARKIN, manager of chemical works, subjects of the Queen of Great Britain and Ireland, and residing, respectively, WILLIAM BLACK at North Eastern Foundry, and THOMAS LARKIN at East Jarrow, both at South Shields, in the county of Durham, England, have jointly invented certain Improvements in Roasting-Furnaces, for the manufacture of sulphate of soda or hydrochloric acid or for calcining ores or for analogous purposes, (for which we have obtained a patent in Great Britain, No. 4,718, dated March 11, 1884,) of which the following is a specification.

Our invention consists in providing furnaces for the manufacture of sulphate of soda, sulphate of potash, or hydrochloric acid, or for roasting or calcining soda made or produced by what is known as the ammonia process or ores or for like operations, with separate fire-places, so that the heat therefrom passes over and under a box chamber, or receptacle, preferably circular, for the matter to be treated in such a manner that the flames and gases from the fires are neither brought into contact with the matter being treated upon the bed of the furnace nor into contact with the machinery for stirring the said substance. The gases from the said substance are therefore prevented from uniting with waste gases of the fires, and the machinery is not subjected to an excessive heat liable to cause fracture of the machinery.

We will describe our invention with reference to the accompanying drawings, wherein—

Figures 1, 2:
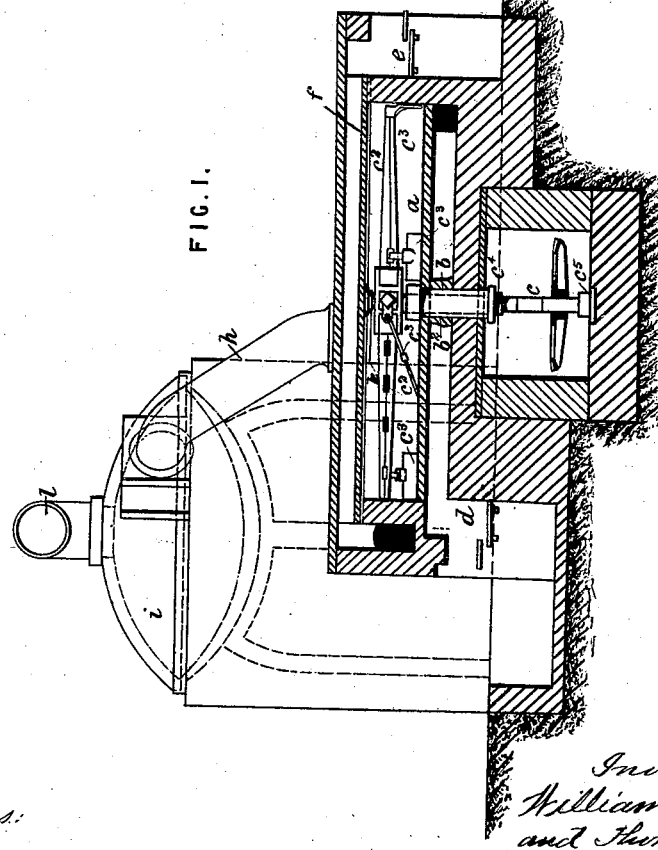
Figure 3:
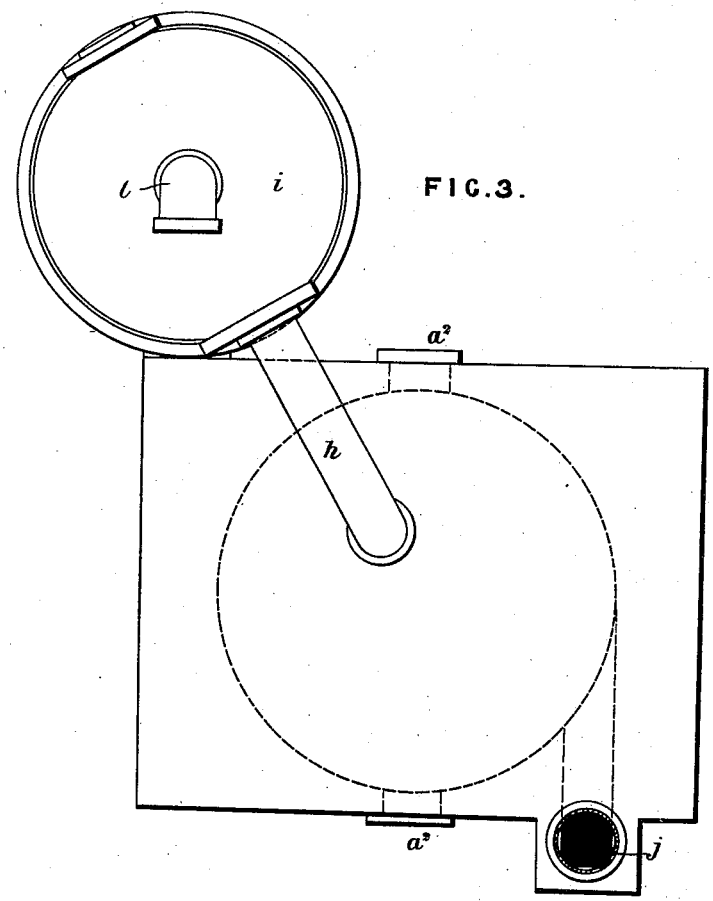

Figures 1 and 2 are sections at right angles to each other, and Fig. 3 is a plan of a furnace constructed according to our invention.

In constructing a furnace according to our invention the bed $a$ is made of fire-clay, quartz, metal plates, or other suitable material. The said bed and also the bottom of the flue beneath are provided with holes in the center through which is passed and fixed a tube, $b$, of fire-clay, cast-iron, or other suitable material, which serves to protect the shaft $c$ at the part passing through the flue from being exposed to an undue amount of heat. The said tube when of metal may be protected by fire-clay, as at $b^2$. The lower fire-places, one of which is shown at $d$, are all placed at one end, and they have a grate-area arranged to afford and distribute the required heat under the bed $a$. The heat from the bottom fires is conducted under the said bed either by what are known as "flash-flues" or by return flues into the main flue. The upper fire-places (one of which is shown at $e$) are placed preferably at the end opposite to that at which the lower fire-places, $d$, are situated, and the products from them are carried over the covers $f$ of the furnace, by means of flues, until they reach the opposite end of the furnace, where they pass into the main flue, or they may be brought down and under the bed by return flues and then be passed into the main flue.

The cover $f$ of the furnace may be made of quartz, cast-iron plates, or other suitable materials. These plates may be supported by the lower flanges of a girder or girders, as shown at $g$, Fig. 2, or in any other suitable manner so as to prevent escape of gases through the said cover $f$.

In this construction of furnace the box, chamber, or receptacle, bounded at the bottom side by the bed $a$ and on the top side by the cover $f$, has no direct communication with any of the flues which lead from the fire-places. The said box, chamber, or receptacle is fitted with doors (for example, as at $a^2$) of such dimensions and in such manner as will allow the charge to be withdrawn when finished. The charge may be introduced into the roasting-chamber or receptacle by means of a channel or pipe, as at $h$, leading into the furnace from a decomposing-pan, as at $i$, or by any other convenient method.

The gases from the charge may be taken from the furnace by means of an aperture in the side or other available part of the furnace, and in such a manner that it shall be free from contact with the products of combustion from the fires. In the drawings, a pipe, $j$, is shown for this purpose.

The machinery for stirring or agitating the materials under operation consists of arms $c^2$ carried by the rotating shaft $c$ and having stirrers or scrapers $c^3$ hung on them in a position suitable for stirring or agitating the materials. The flames are prevented from impinging on the shaft $c$ by means of the aforesaid tube $b$, and the said shaft is fitted with a lute at the bottom end of the said tube outside the furnace, as at $c^4$, to effect a closure at this part. The shaft may be steadied at the top end by a bracket, $k$, fixed on one of the girders which support the cover. The bottom end of the shaft may be supported on a foot-step, $c^5$, and be rotated by spur or other suitable gear. $l$ is the outlet for gas from the pan $i$.

We are aware that furnaces have been provided with closed heating-chambers containing stirrers, with heating-flues both above and below the chamber; but, so far as we are aware, it is new to provide the upper and lower flues with separate fire-places at the opposite ends or sides of the furnace, as above described and shown in our drawings, to get an even distribution of the heat.

We therefore claim as our invention—

1. The closed roasting-chamber of a furnace in combination with an upper set of fire-places, $e$, at one end thereof, having their flues above the roasting-chamber, and a lower set of fire-places, $d$, at the other end, having their flues below said roasting-chamber, substantially as set forth.

2. The closed roasting-chamber of a furnace, having rotary stirrers therein, in combination with an upper set of fire-places, $e$, at one end thereof, having their flues above the roasting-chamber, and a lower set of fire-places, $d$, at the other end, having their flues below the said chamber, substantially as described.

In testimony whereof we have signed our names to this specification in the presence of two subscribing witnesses.

WILLIAM BLACK.
THOMAS LARKIN.

Witnesses:
EDWARD WATSON JOHNSTON,
North Eastern Foundry, South Shields.
JAMES CALVERT ROLLIN,
1 St. Nicholas Buildings, Newcastle-on-Tyne.